Oct. 22, 1968
H. M. ARNESON
3,406,870
SWIMMING POOL CHLORINATOR
Filed April 18, 1966
3 Sheets-Sheet 2
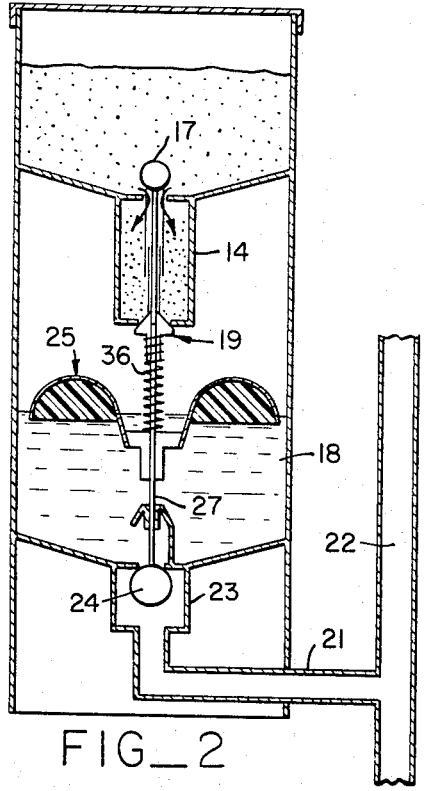
FIG_2
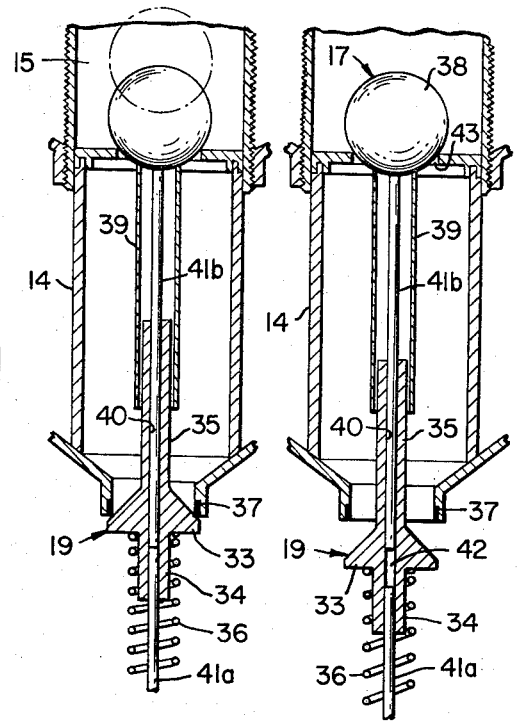
FIG_3A  FIG_3B
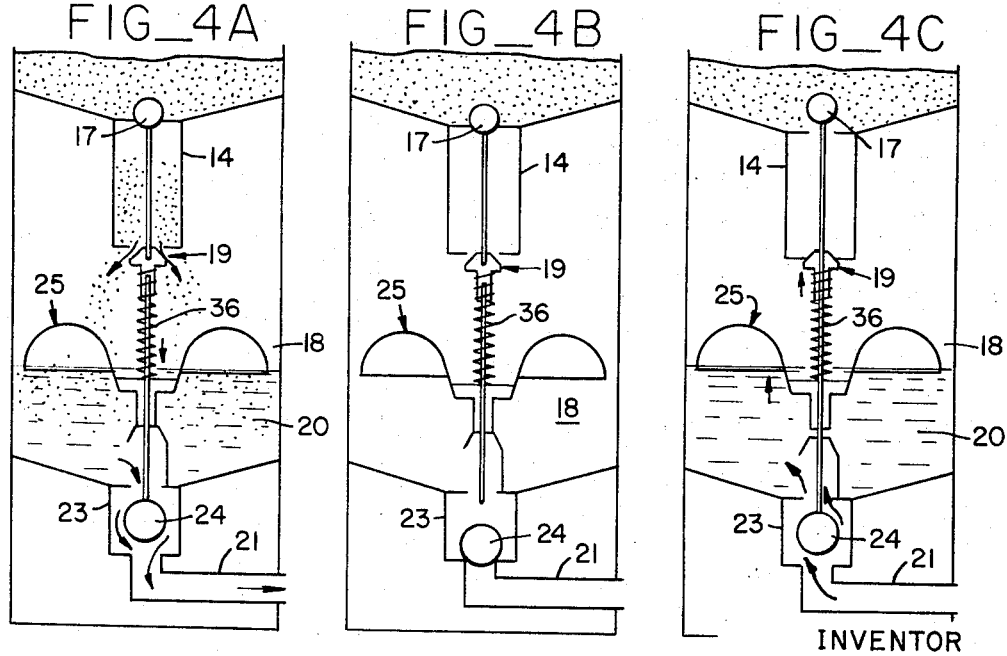
FIG_4A  FIG_4B  FIG_4C
INVENTOR
HOWARD M. ARNESON
Townsend & Townsend
ATTORNEYS

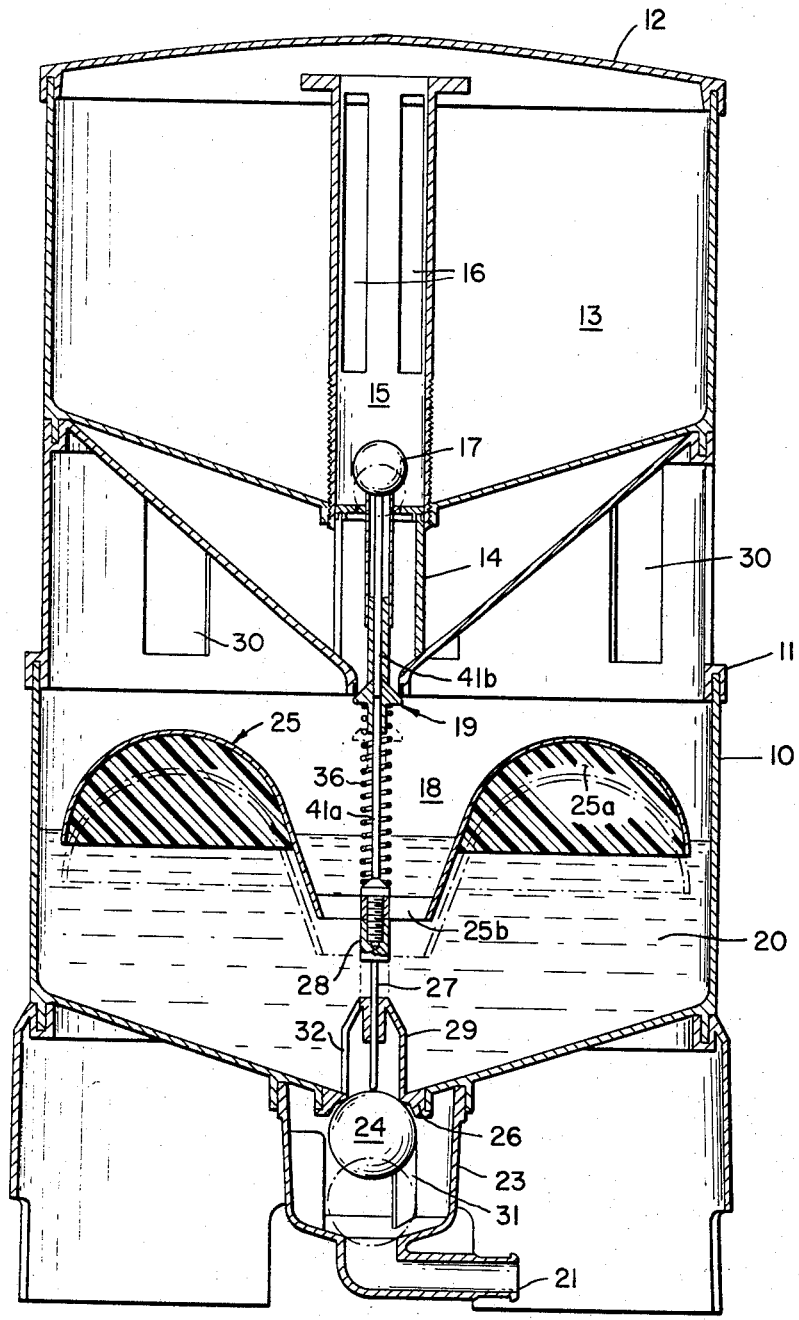
FIG_1

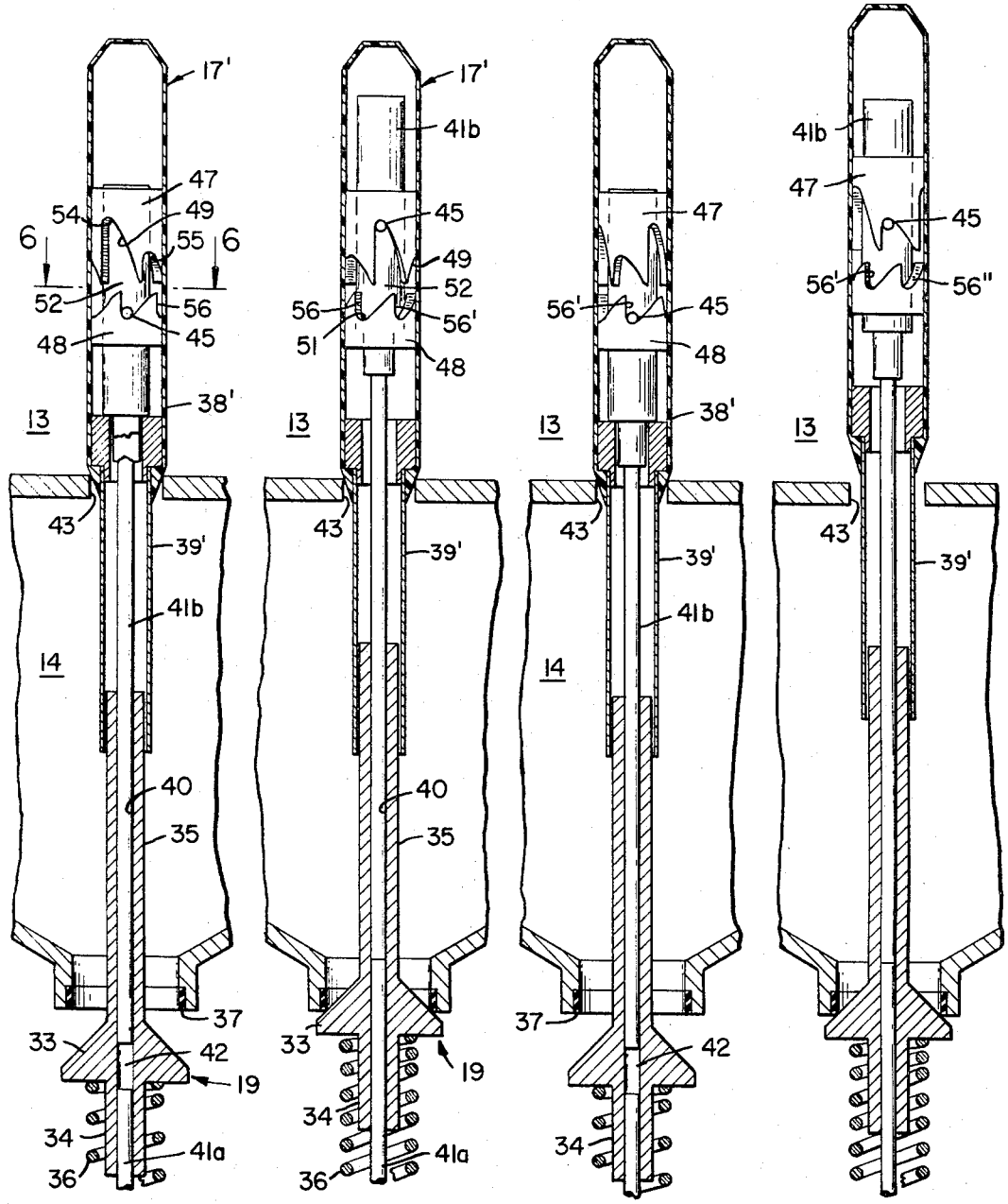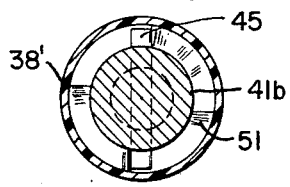

United States Patent Office 3,406,870
Patented Oct. 22, 1968

3,406,870
SWIMMING POOL CHLORINATOR
Howard M. Arneson, San Rafael, Calif., assignor to Arneson Products, Inc., San Rafael, Calif., a corporation of California
Filed Apr. 18, 1966, Ser. No. 543,418
7 Claims. (Cl. 222—57)

ABSTRACT OF THE DISCLOSURE

A dispenser for mixing metered charges of a solid with a liquid including a mixing chamber for combining the solid and liquid charges, a conduit for receiving and discharging liquid from the mixing chamber, first valve means for controlling fluid flow between the conduit and mixing chamber, a charge chamber disposed above the mixing chamber, a second valve for controlling communication between the mixing chamber and the charge chamber, a third valve for controlling communication between the charge chamber and a reservoir, a valve-controlling device, including a buoyant member that is responsive to changes in the liquid level in the mixing chamber for sequencing the position of the valves to introduce a predetermined amount of solid into the mixing chamber and thereafter releasing the mixture to the conduit. The third valve is alternatively defined as being suitable for reciprocal movement at less frequent intervals than the movement of the first and second valves.

---

This invention relates to apparatus for automatically measuring out a quantity of liquid or solid, mixing it with a relatively larger volume of liquid, and then discharging such mixtures at a frequency appropriate for the environment in which the apparatus is used. In the preferred embodiment, the apparatus is used to dissolve a charge of water sanitizing powder, such as a chlorine liberating composition, into swimming pool water through the pool's filter system at a frequency which keeps the pool water in a healthy condition.

In swimming pools, and particularly the smaller type found in private homes, maintenance of the water in a healthy condition could become a tedious chore if accomplished manually. The present automatic system for introduction of suitable water purifying chemicals is designed to relieve the pool owner of such a burden and assure proper condition of the water at all times.

Automatic dispensers particularly suited to swimming pool use must be capable of dispensing solids in powder or granular form, since that is the physical state of some of the chemicals which have found wide-spread use. Such chemicals may liberate chlorine in one form or another when dissolved in the pool water. It is not feasible to store such supplies in dilute liquid form much prior to use for a number of technical reasons related to stability, corrosiveness and the like of the chemicals.

The present device mixes the solid material with water just prior to use in the pool. The device takes advantage of the normal water pressure cycle in the pool's filter lines to automatically trigger the discharge of powder at intervals which result in the desired degree of water purification. In essence, the preferred device is tied into the pool filter lines so that the rise and fall of water pressure in the filter line can be communicated to the dispensing unit. When the filter system is turned on and the water pressure in the filter line increases, the increased pressure is harnessed to open a valve and admit water to a mixing tank. The water level is regulated by a main float valve which causes the inlet valve to close at an appropriate time. The rising water level also causes the float to actuate two other valves in appropriate sequences so that a charge chamber of requisite volume is first filled from a reservoir containing a supply of the chemical powder and then the measured charge is dropped into the water in the mixing tank for combination therewith. The mixed solution is discharged back into the filter line when the water pressure in the filter line drops sufficiently so that the inlet valve opens and permits the discharge.

In addition to the basic structure needed to accomplish the above, a number of specific features are incorporated which make the apparatus especially adapted for its use in the principal area contemplated. Thus, the inlet valve selected is a ball float type which together with the type of valve chamber used in conjunction with the ball float provides a dual function during a complete cycle. The ball float serves to stop inlet of water when the proper volume has entered the mixing chamber. At the opposite end of the cycle, after the water containing chemicals dissolved or mixed therein has been discharged, the ball moves into position to close communication with the filter line and avoid air passage into the filter system which might otherwise interfere with its proper functioning.

In another portion of the apparatus in connection with the charge measuring chamber, steps have been taken to buffer the inlet valve to the charge chamber from the pressures exerted by the total weight of the bulk material stored in the reservoir so that the valve can be easily opened solely by the forces developed from the rising float in the mixing chamber. Thus, an intermediate buffer chamber between the charge metering chamber and the reservoir is utilized. The buffer chamber is designed to hold a charge of material approximately equal to that needed to fill the charge metering chamber and the inlet valve to the charge chamber needs only to open against this relatively small quantity of material.

In certain of the preferred applications of the present device, it is desirable for the discharge of powdered or granular solids to occur less frequently than during each filtration cycle. Such a situation can be readily envisioned, for example, in a private pool which is only subjected to infrequent heavy use. When such conditions exist, sufficient chlorine-liberating solids may be introduced by employing an automatic dispenser which is activated only during alternate, or even less frequent, filtration cycles. Other features of the invention will be dealt with in detail in connection with the description of the drawings.

In the accompanying drawings:

FIGURE 1 shows a side sectional view of the dispenser unit provided by the present invention.

FIGURE 2 is a partially schematic side sectional view of the apparatus of FIGURE 1 illustrating the position of the components during filling of the charge metering chamber.

FIGURES 3a and 3b are side sectional views of the charge metering chamber and associated valves illustrating the manner in which the valves are actuated.

FIGURES 4a, 4b and 4c are schematic presentations of the present apparatus illustrating the relative positions of all the component parts throughout an entire cycle of operation.

FIGURES 5a, 5b, 5c and 5d are side sectional views illustrating an alternate embodiment of the charge metering chamber and associated valves.

FIGURE 6 is a cross sectional view taken along the line 6—6 of FIGURE 5.

With respect to the drawings, FIGURE 1 shows one form of the invention in which the unit is housed in a structure made from interlocking component parts adapted for quick assembly and disassembly. Thus, outer walls 10 of the unit are made by frictionally engaging members by means of tongue and groove type interlocks, such as 11. The structure has a removable top 12 which locks to the outer walls together in like manner and is removable for placement of bulk powder supplies into reservoir 13.

Charge metering chamber 14 is disposed beneath reservoir 13 so that powder can be flowed into charge chamber 14 under gravitational forces. A buffer chamber 15 is situated between reservoir 13 and meter chamber 14. Powder (or other type of substance) flows from reservoir 13 into buffer chamber 15 through slots 16 until buffer chamber 15 is filled to about the bottom margin of slots 16. Buffer chamber 15 has a volume approximately equal to that of charge chamber 14. Valve 17, which opens and closes communication between charge chamber 14 and buffer chamber 15, has to work only against the resistance of the mass in buffer chamber 15 when opening, instead of the entire mass in reservoir 13. The powder in charge chamber 14 is metered into mixing chamber 18 upon the opening of valve 19 which opens and closes communication between mixing chamber 18 and charge chamber 14.

Water on other liquid for dissolving and mixing with the metered powder from charge chamber 14, as shown at 20, is introduced into mixing chamber 18 from conduit 21. In the preferred use, conduit 21 is in communication with the pipes of a typical swimming pool filter system as illustrated at 22 in FIGURE 2. Water enters through the inlet valve chamber 23 upon opening of valve 24. As the water shown generally at 20 rises, float assembly 25 rises therewith. Rising of float assembly 25 sequences and controls the operation of valves 24, 19 and 17, as will be described more fully. Float assembly 25 may take any suitable form and is shown as plastic foam buoyant member 25a mounted on a central frame 25b.

With the proper amount of water in mixing chamber 18, the charge in chamber 14 is dumped into chamber 18 and the mixture is flowed out past valve 24, through chamber 23 and conduit 21 back into pool filter line 22.

Opening and closing of valve 24 is accomplished through changes in pressure in filter line 22 which are imparted through conduit 21 to inlet ball float valve chamber 23. When the filter system of the pool is actuated, and its pump energized, the pressure in filter line 22 rises. Just prior to the increase in pressure, due to gravity, ball float 24 is in the position shown in FIGURE 4b and in dotted lines in FIGURE 1. Fluid communication between mixing chamber 18 and conduit 21 is closed. This closed position prevents air passage between chamber 18 and the internal mechanisms of the filter system and pumps which might otherwise interfere with the proper filtration and pumping action.

Thereafter, as the pressure in conduit 21 increases, ball float 24 is pushed upwardly in chamber 23 as illustrated in FIGURE 4c so that fluid communication between conduit 21 and mixing chamber 18 is opened. Water flows into mixing chamber 18 as shown by the arrows in FIGURE 4c. The liquid level in mixing chamber 18 increases and float assembly 25 rises. In the absence of a means to prevent it from happening, ball float valve 24 would tend to float and rise, under the pressures present, to the top of chamber 23, engage valve seat 26, and prematurely stop the filling of mixing chamber 18 until the pressure in conduit 21 dropped sufficiently to permit descent of ball float 24. So that valve 24 will not close against valve seat 26 prematurely, leg 27 is depended downwardly from threadably engageable mounting 28 (attached centrally of frame 25b) of float assembly 25. Leg 27 depends through the top of inlet housing 29 through the central aperture defined by valve seat 26 and into inlet valve float chamber 23 where contact with ball float 24 is made as shown in FIGURE 4c. Leg 27 prevents upward movement of ball float 24 to prematurely close the valve until the liquid level in mixing chamber 18 has reached a desired predetermined point. At such time, float assembly 25 has risen upwardly to such a height that leg 27 no longer extends through valve seat 26, thus permitting ball float valve 24 to seal against seat 26 under impetus of fluid pressure in conduit 21. Ball float 24 may be suitably guided with a valve guide 31 disposed in chamber 23 so that float 24 moves in a restricted path and assures engagement with valve seat 26 at the proper time.

During filling of mixing chamber 18, suitable ports, such as 30, open to the ambient atmosphere are provided to avoid creating back pressure from compression of air in chamber 18 and negative pressures during subsequent discharge.

As indicated, during ingress the fluid moves around the exterior of ball float 24 through the central aperture defined by valve seat 26 and upwardly through port 32 of inlet housing 29 and into mixing chamber 18. During this input of liquid and filling of mixing chamber 18, valve 19 is closed and valve 17 is opened so that charge metering chamber 14 can be filled. The rising of float assembly 25 with the inlet of liquid serves to position valves 19 and 17 accordingly. With reference particularly to FIGURES 3a and 3b, valve 19 includes a valve head 33 with depending stem 34 and upwardly extending stem 35. A spring 36 is mounted to engage depending stem 34 beneath valve head 33 and at its other end spring 36 is attached to mounting 28. As float assembly 25 rises, spring 36 in turn is moved upwardly and valve head 33 is in turn moved against its mating valve seat 37 in the bottom of charge metering chamber 14. FIGURE 4b shows the relative postions just prior to closing of valve 19. Continued upward movement of float assembly 25 thereafter causes the opening of valve 17 for the filling of chamber 14 as follows: valve 17 comprises a valve head 38 and depending stem 39 defining a sleeve-like configuration. Upwardly extending valve stem 35 of valve 19 is inserted interiorly of sleeve-like stem 39 for the mutual guidance of both valves 17 and 19. Valve 19, including head 33 and the stems 34 and 35 define a channel 40 therethrough in which is inserted a two-part arm 41a and 41b. When valve 17 is closed, and float assembly 25 is in a relatively downward position, as occurs when chamber 18 has a low fluid level, a space 42 is defined between two-part arm 41a and 41b. When float assembly rises to the point where valve 19 is in seated closed position as shown in FIGURE 3a, space 42 is no longer present and arm parts 41a and 41b are in abutting relationship as also shown in FIGURE 3a. Continued upward movement of float assembly 25 is thereby translated directly to valve 17 and valve head 38 is in turn pushed upwardly into the position shown in dotted lines in FIGURE 3a to thereby open the valve and allow powder to fall into chamber 14 from buffer chamber 15. Such movement is permitted due to the compressible nature of spring 36, which allows the continued upward movement despite the fact that valve 19 has previously been seated and can no longer be moved upwardly. Filling of chamber 14 then occurs with all parts in the position of maximum upward travel, as illustrated in FIGURE 2.

When the pressure in conduit 21 drops because of cessation of activity in the pool filter system, ball float 24 drops out of contact with its valve seat 26 and the solution in mixing chamber 18 begins to discharge as illustrated in FIGURE 4a. Ball float 24 does not move into closed position at the bottom part of chamber 23, since it floats on the liquid passing through chamber 23. As the liquid is being discharged from chamber 18, float assembly 25 begins to move downwardly with the lowering of the liquid level in chamber 18. Concurrently with this downward movement, arm part 41a is moved downwardly and again opens space 42 between it and arm part 41b. This permits valve head 38 to drop back into closed position in contact with its valve seat 43 as illustrated in FIGURE 3b and indicated schematically in FIGURE 4a. Continued emptying of solution from chamber 18 causes further downward movement of float assembly 25 and spring 36. Spring 36 has been decompressed by the initial movement that opened space 42. Added downward movement of float assembly 25 and spring 36 moves valve head 19 out of contact with its seat 37, and the powder contained in chamber 14 then dumps into the remaining liquid in mixing chamber 18 for combination therewith and discharge. The position of the members at the point of emptying of chamber 14 into mixing chamber 18 is illustrated in FIGURE 4a.

When substantially all of the liquid and powder mixture from mixing chamber 18 has been discharged, ball float 24 is thereby permitted to move into a closed position as shown in dotted lines in FIGURE 1 and illustrated schematically in FIGURE 4b. The apparatus is now in position for a repeat of the cycle upon an increase in fluid flow and pressure in conduit 21.

In the embodiment illustrated in FIGURES 5a, 5b, 5c and 5d, valve 17' is constructed so that it will be activated only during alternate upward movements of float assembly 25. Valve 17' comprises a tubular valve head 38', depending stem 39' and arm 41b'. Tubular valve head 38' may be formed of any suitable material such as a rigid plastic. The lower portion of arm 41b' is positioned in the channel 40, previously described. The upper portion of arm 41b' is axially aligned within depending stem 39' and extends into valve head 38'. Arm 41b' is provided near its upper end with an engaging pin 45 preferably normal to the axis of arm 41b'.

Affixed to the internal surface of tubular valve head 38' are spaced upper and lower guide members 47 and 48 which define continuous opposed interleaved scroll cam surfaces 49 and 51, respectively. The continuous upper scroll cam surface 49 and lower scroll cam surface 51 define between them cylindrical space 52 through which the ends of engaging pin 45 are caused to move relative to valve 17' during operation of the automatic dispenser as hereinafter described.

Upper scroll cam surface 49 is provided with alternate deep indentations 54 and shallow indentations 55. Lower scroll cam surface 51 is formed from a series of indentations 56, each preferably of substantially similar depth.

When float assembly 25 is in a relatively downward position, as occurs when chamber 18 has a low fluid level, valve 17' will be positioned in valve seat 43 thereby sealing charge metering chamber 14 from reservoir 13 as illustrated by FIGURE 5a. Furthermore, the weight of arm 41b' and pin 45 will cause the ends of pin 45 to rest within first indentation 56 also as shown in FIGURE 5a. Under these conditions space 42 will be provided between the proximal ends of arm 41a and 41b'.

As previously described with reference to FIGURES 3a and 3b, float assembly 25 moves upward when the liquid level in mixing chamber 18 rises. The upward movement of float assembly 25 forces valve 19 into seated closed position with mating valve 37, and arm 41a into proximal contact with arm 41b; by elimination of space 42. Additional vertical movement of the float assembly 25 causes compression of spring 36. Continued vertical movement of arm 41a forces arm 41b' upward, thereby normally displacing engaging pin 45 through a predetermined vertical distance. This predetermined vertical distance is regulated by leg 25, as previously described.

As engaging pin 45 rises in response to the pressure exerted on arm 41b' by arm 41a through the predetermined vertical distance, it engages scroll cam surface 49 of upper guide member 47. The vertical force exerted by engaging pin 45 along the incline of cam surface 49 causes counter-clockwise horizontal movement of valve 17'. As illustrated by FIGURES 5a and 5b, when engaging pin 45 is aligned with that portion of scroll cam surface 49 containing deep indentation 54, engaging pin 45 will rise through the predetermined vertical distance without causing a vertical movement of valve 17' from valve seat 43. FIGURE 5b shows the relative position of the various parts at maximum upward travel in the absence of displacement of valve 17'.

The aforementioned horizontal counter-clockwise movement of valve 17' changes the position of pin 45 relative to scroll cam surfaces 49 and 51. As arm 41b' and pin 45 move downward, when arm 41a is withdrawn, pin 45 is horizontally advanced relative to tubular head 38' so as to engage lower cam surface 51 along the side of second indentation 56'. The downward gravitational displacement of engaging pin 45 causes further horizontal counter-clockwise movement of valve 17' until pin 45 is positioned in the lowermost portion of second indentation 56'. It will be seen from FIGURE 5c that valve 17' is then rotated so that shallow indentation 55 in scroll cam surface 49 is located substantially directly above pin 45.

When the automatic dispenser is again activated by a rise in the liquid level in mixing chamber 18, spring 36 will again force valve 19 upward until valve 19 engages mating valve seat 37. As during the previous cycle, arm 41a then engages arm 41b causing a corresponding predetermined vertical movement of engaging pin 45 so that pin 45 contacts upper cam surface 49 in close proximity to shallow indentation 55. When pin 45 through vertical movement occupies the apex of shallow indentation 55, additional vertical movement of pin 45 is no longer transferred along scroll cam surface 49 to horizontal counter-current movement of valve 17'. During the remaining predetermined vertical movement of arm 41b' and pin 45 (in response to the upward pressure of arm 41a) cylindrical valve head 38' is vertically displaced from valve seat 43, thereby opening valve 17' so that charge metering chamber 14 can be filled from reservoir 13, as illustrated by FIGURE 5d.

When the upward force is again removed from arm 41b' by withdrawal of arm 41a as previously described, pin 45 moves downward contacting lower cam surface 51 near a third indentation 56", thereby causing further horizontal counter-clockwise movement of valve 17' until the arm 41b', pin 45 and head 38' are again similarly positioned as illustrated in FIGURE 5a.

FIGURE 6 illustrates the structural relationship of engaging pin 45 with respect to arm 41b' and scroll cam surface 51. It will be obvious to the art that when desired, various combinations of deep and shallow indentations in upper guide member 47 can be provided to activate valve 17' more or less frequently than alternately.

While one embodiment of this invention has been shown and described it will be apparent that other adaptations and modifications can be made without departing from the true spirit and scope of the invention.

What is claimed:

1. A dispenser for mixing metered charges of a substance with liquid and discharging the mixture comprising: a mixing chamber for combining the metered charge with liquid; a conduit for introducing and discharging liquid into and out of said mixing chamber; first valve means associated with said conduit to open and close fluid communication between the conduit and said mixing chamber under preselected conditions of liquid flow through said conduit; liquid level sensing means cooperating with said mixing chamber; a charge chamber communicating with said mixing chamber of preselected volume; second valve means for opening and closing communication between said mixing chamber and charge chamber; a reservoir for the substance to be metered for filling said charge chamber and communicating therewith; third valve means for opening and closing communication between said reservoir and charge chamber; valve control means actuated by changes in the liquid level through said liquid level sensing means; said valve control means including means for sequencing said first, second, and third valve means so that said second valve means is closed at least part of the time when said first valve means is open for filling said mixing chamber with liquid and when said third valve means is open for filling said charge chamber from said reservoir, and so that said second valve means is open when said third valve means is closed for introducing a charge from said charge chamber to said mixing chamber for combination with liquid therein.

2. A dispenser in accordance with claim 1 wherein said liquid level sensing means is disposed within said mixing chamber and is adapted for movement by liquid in the mixing chamber in direct proportion to the level thereof, and said valve control means is connected thereto and actuated by movement of said level sensing means.

3. A dispenser in accordance with claim 2 wherein said valve control means includes a first valve control actuated by movement of said liquid level sensing means to regulate closure of said first valve means and thereby control input of liquid to said mixing chamber, and a second valve control actuated by movement of said liquid level sensing means to regulate the opening and closure of both said second and third valve means.

4. A dispenser in accordance with claim 1 and including a buffer chamber between said reservoir and charge chamber, said buffer chamber having a substance holding volume approximately equal to that of the charge chamber.

5. A dispenser in accordance with claim 1 wherein said third valve means comprises a valve seat, a vertically positioned tubular head member open at one end and normally engaging said valve seat, spaced-apart upper and lower cylindrical guide members disposed within and rigid to said tubular head member, said guide members having continuous opposed scroll cam surfaces, said valve control means extending into said one open end and having a pin attached near its upper end and normal to the axis of said head member, said pin extending between said opposed cam surfaces, said surfaces having respective offset indentations adapted for engaging said pin therebetween during vertical movement of the latter in response to vertical displacement of said valve control means, said scroll surface of said upper guide member having both deep and shallow indentations, said deep indentations being of sufficient depth to allow vertical movement of said pin means in response to vertical displacement of said valve control means without vertical displacement of said upper guide member, said shallow indentations being of a depth sufficient to allow vertical movement of said tubular head member during said vertical movement of said pin means in response to vertical displacement of said valve control means.

6. In a valve assembly having a structure defining a valve seat, a vertically positioned tubular head member open at one end and normally engaging said valve seat, spaced-apart upper and lower cylindrical guide members disposed within and rigid to said tubular head member, said guide members having continuous opposed scroll cam surfaces, reciprocating means positioned within said tubular head member along its vertical axis and adapted to extend downwardly through said valve seat, said reciprocating means being further adapted for predetermined vertical displacement, pin means attached to and extending laterally from said reciprocating means near its upper end, said pin means positioned between said opposed cam surfaces, said surfaces having respective offset indentations adapted for engaging said pin means therebetween during vertical movement of the latter in response to vertical reciprocation of said reciprocating means, said scroll surface of said upper guide member having both deep and shallow indentations, said deep indentations being of sufficient depth to allow vertical movement of said pin means through said predetermined vertical displacement without vertical displacement of said tubular head member, said shallow indentations being of a depth sufficient to allow vertical movement of said tubular head member during said predetermined vertical displacement of said pin means.

7. In a tank for mixing a preselected quantity of a substance with liquid in the tank, a plurality of valves, a float assembly in the tank, said float assembly including a buoyant member and means attached thereto for movement up and down with the buoyant member in response to changes in the liquid level in the tank, said means being linked with said valves and adapted for sequentially moving said valves at predetermined intervals to sequentially open and close the valves for metering said preselected quantity of substance into the liquid in said tank, a conduit for input and outlet of fluid to said tank, pressure actuated valve means for opening and closing fluid communication between said conduit and tank, said valve means comprising a chamber and float therein, said conduit opening into one part of said chamber and said tank opening into another portion of said chamber, said float being movable between the opening between said conduit and chamber and the opening between said chamber and tank to alternately close one of said two openings in relation to the fluid pressure in said conduit, and a leg mounted on the buoyant member in said tank and extending through the opening between the tank and chamber, said leg being of sufficient length to contact the float in said chamber and prevent its movement to close communication between the tank and chamber until liquid is introduced into said tank in sufficient volume to raise the buoyant member with said leg out of contact with the float.

References Cited
UNITED STATES PATENTS

| | | | |
|---|---|---|---|
| 740,904 | 10/1903 | Organ | 127—411 X |
| 1,094,003 | 4/1914 | McVay | 222—446 X |
| 1,109,832 | 9/1914 | Graham et al. | 222—67 X |
| 2,181,729 | 11/1939 | Harris et al. | 222—67 X |
| 2,620,097 | 12/1952 | Titmas | 222—67 X |
| 2,793,908 | 5/1957 | Carver | 137—624.14 X |
| 3,084,350 | 4/1963 | Anderson | 222—67 X |
| 3,198,404 | 8/1965 | Welches | 222—446 X |
| 3,229,854 | 1/1966 | Turnquist | 222—442 X |

FOREIGN PATENTS

| | | |
|---|---|---|
| 875,314 | 6/1942 | France. |

ROBERT B. REEVES, *Primary Examiner.*